(12) United States Patent
Ouchi

(10) Patent No.: US 7,151,865 B2
(45) Date of Patent: Dec. 19, 2006

(54) OPTICAL WAVEGUIDE DEVICE, OPTICAL AND ELECTRICAL ELEMENTS COMBINED DEVICE, METHOD OF DRIVING THE SAME, AND ELECTRONIC EQUIPMENT USING THE SAME

(75) Inventor: Toshihiko Ouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/735,903

(22) Filed: Dec. 16, 2003

(65) Prior Publication Data

US 2004/0126053 A1 Jul. 1, 2004

Related U.S. Application Data

(63) Continuation of application No. PCT/JP03/13699, filed on Oct. 27, 2003.

(30) Foreign Application Priority Data

Oct. 29, 2002 (JP) .............................. 2002-313733

(51) Int. Cl.
G02B 6/12 (2006.01)
(52) U.S. Cl. .......................................... 385/14; 385/24
(58) Field of Classification Search .................. 385/14, 385/15, 18, 24, 31, 39, 47
See application file for complete search history.

(56) References Cited

U.S. PATENT DOCUMENTS

| 4,267,587 | A | * | 5/1981 | Mizuno et al. ................ 368/85 |
| 4,845,702 | A | * | 7/1989 | Melindo ...................... 398/54 |
| 5,191,219 | A | | 3/1993 | Linke |
| 5,268,973 | A | | 12/1993 | Jenevein |
| 5,349,598 | A | | 9/1994 | Ouchi et al. |
| 5,594,577 | A | | 1/1997 | Majima et al. |
| 5,636,045 | A | | 6/1997 | Okayama et al. |
| 5,654,814 | A | | 8/1997 | Ouchi et al. |
| 5,742,418 | A | | 4/1998 | Mizutani et al. |
| 5,757,828 | A | | 5/1998 | Ouchi |
| 5,844,542 | A | | 12/1998 | Inoue et al. |
| 5,987,165 | A | | 11/1999 | Matsuzaki et al. |
| 6,301,401 | B1 | * | 10/2001 | La .............................. 385/14 |
| 6,342,952 | B1 | | 1/2002 | Chan |
| 6,535,661 | B1 | * | 3/2003 | Takahashi et al. ............ 385/15 |
| 6,597,713 | B1 | | 7/2003 | Ouchi |
| 2004/0042705 | A1 | * | 3/2004 | Uchida et al. ................ 385/14 |

FOREIGN PATENT DOCUMENTS

| DE | 34 00 480 A1 | 9/1985 |
| EP | 0 536 892 | 4/1993 |
| JP | 62-204208 | 9/1987 |

(Continued)

OTHER PUBLICATIONS

Balliet, L., et al., Optical Transmission System for Interconnecting Electronic Units, IBM Technical Disclosure Bulletin, vol. 26, No. 4, Sep. 1983, pp. 1793-1796.

(Continued)

*Primary Examiner*—Juliana Kang
(74) *Attorney, Agent, or Firm*—Fitzpatrick, Cella, Harper & Scinto

(57) ABSTRACT

Disclosed is an optical waveguide device including an optical waveguide, and optical input and output ports for inputting and outputting an optical signal to and from the optical waveguide, characterized in that the optical input port receives an optical signal inputted from the optical output port to the optical waveguide in accordance with a timing control signal inputted as an electrical signal to the optical input port.

16 Claims, 8 Drawing Sheets

FOREIGN PATENT DOCUMENTS

| | | |
|---|---|---|
| JP | 07-336299 | 12/1995 |
| JP | 08-293836 | 11/1996 |
| WO | WO 93/05590 | 3/1993 |
| WO | WO 01/28231 | 4/2001 |

OTHER PUBLICATIONS

"ICC Profile Format Specification", International Color Consortium, pp. 1-114, Aug. 15, 1997.

* cited by examiner

OPTICAL SIGNAL
(FROM LSI1)

ELECTRICAL
CONTROL
SIGNAL

RECEIVED SIGNAL
(LSI2)

OPTICAL SIGNAL (FROM LSI2)

OPTICAL SIGNAL (FROM LSI5)

OPTICAL WAVEGUIDE DEVICE, OPTICAL AND ELECTRICAL ELEMENTS COMBINED DEVICE, METHOD OF DRIVING THE SAME, AND ELECTRONIC EQUIPMENT USING THE SAME

This application is a continuation of International Application No. PCT/JP03/13699 filed on Oct. 27, 2003, which claims the benefit of Japanese Patent Application No. 2002-313733 filed on Oct. 29, 2002.

BACKGROUND OF THE INVENTION

1. Field of the Invention

The present invention relates to an optical waveguide device including an optical waveguide and optical input and output ports for optically connecting a signal between electrical chips or the like within an electrical circuit substrate or a package, an optical and electronic elements combined device including the optical connection device and electrical circuits, a method of driving the optical and electrical elements combined device, and an electronic equipment using the optical and electrical elements combined device.

2. Related Background Art

In order to realize high performance of personal computers, mobile devices typified by cellular phones and PDAs (Personal Digital Assistants), digital AV (Audio Visual) apparatuses, and the like supporting the advanced information-oriented society, a large number of highly integrated LSI chips are used. Then, a mounting technique for operating the LSI chips integrated with high density at a high speed is required. However, the mounting technique using only a conventional electrical connection has reached the limit in solution of the problems of transmission delays and crosstalk, reduction of the EMI (Electromagnetic Interference), and the like. Thus, for the purpose of attaining the above-mentioned request, a system using an optical connection together with the conventional electrical connection has been examined.

Several examples of applying the optical connection to chips have been proposed. For example, it is disclosed in JP 8-293836 A that a slab type waveguide which is made of an organic polymer and which is formed on a flat substrate is used as a transmission medium. It is conceivable that this system has merits that the slab type waveguide has excellent matching with an LSI chip, or a board or a package having the LSI chip mounted thereto and is easy to be manufactured and also can be freely connected between chips as compared with a system for forming a line-shaped optical waveguide. An example of an optical connection device disclosed in JP 8-293836 A is shown in FIG. 11. In the device of FIG. 11, signal originating elements 204 and 206, and a signal receiving element 205 are provided on an insulating layer 208 of a substrate 201' including an optical waveguide layer and encapsulated with a polymer encapsulation material 209, and an LSI board 202 is mounted thereto to thereby realize transmission of a signal between LSIs using a slab type optical waveguide 201" (signal light 203). A hologram 207 is used for an optical coupling between the signal originating elements 204 and 206, and the signal receiving element 205, and the waveguide 201". Moreover a wavelength controlling element controls a coupling state between the elements.

However, in the above-mentioned device disclosed in JP 8-293836 A as well, a signal light transmitted through a common waveguide does not always become a signal to be received by a predetermined light receiving element.

SUMMARY OF THE INVENTION

It is an object of the present invention to provide an optical waveguide device having a configuration adapted to selectively receive a desired signal of optical signals propagated through an optical waveguide, an optical and electrical elements combined device, a method of driving the optical and electrical elements combined device, and an electronic equipment using the optical and electrical elements combined device.

According to the present invention, there is provided an optical waveguide device including an optical waveguide, and optical input and output ports for inputting and outputting an optical signal to and from the optical waveguide, characterized in that the optical input port receives an optical signal inputted from the optical output port to the optical waveguide in accordance with a timing control signal inputted as an electrical signal to the optical input port.

According to the optical waveguide device of the present invention, the light input port (light receiving unit) can selectively receive only a necessary signal. Moreover, in a case where a plurality of light input ports are connected to the above-mentioned optical waveguide, it becomes possible to provide the optical waveguide device with which the above-mentioned timing control signal is used to thereby enable an optical waveguide device to be provided in which a method of optically connecting an optical signal between the light input and output ports is reconstitutable. With this constitution, a configuration of the optical connection through the optical waveguide is not substantially changed, and hence a reconfigurable wiring for a light is established in accordance with the control for an electrical signal which can be transmitted at a lower speed than that of an optical signal. Consequently, the optical waveguide device can be realized at a relatively low cost with a structure requiring no accurate control, but making use of an advantage of the optical connection while suppressing a disadvantage of the electrical connection.

According to the present invention, there is provided an optical and electrical elements combined device, including electrical circuits, electrical chips for operating the electrical circuits, and the optical waveguide device of the present invention, the optical and electrical elements combined device being characterized in that a signal connection between the electrical chips is carried out using both an optical connection using the optical signal, and an electrical connection using at least the timing control signal used to control transmission and reception of the optical signal.

According to the present invention, there is provided a method of driving the optical and electrical elements combined device as described above, comprising the steps of: forming the optical signal transmitted from the side of the optical output port from a packet signal train formed of a finite pulse train; individually transmitting the timing control signal as an instruction signal used to select adoption or rejection of a packet signal to the side of the optical input port to carry out time division packet switching to thereby switch an optical connection between the optical input and output ports; transmitting an electrical signal used to select adoption or rejection of the packet signal with a clock frequency depending on a repetitive period of a packet train from the electrical chip for transmission; and receiving an electrical signal pulse used to select adoption or rejection of the packet signal at a timing earlier than a packet train selected in the electrical chip for reception to start capturing the packet signal at a timing of fall of the electrical signal pulse.

According to the present invention, there is provided an electronic equipment, characterized in that a high speed optical connection between electrical chips can be freely reconfigured by incorporating the optical and electrical elements combined device of the present invention, and connections among a plurality of built-in systems can be switched at a high-speed with one equipment.

According to the present invention, it becomes possible to provide an optical waveguide device having a structure adapted to selectively receive a desired optical signal of optical signals propagated through the optical waveguide and the like.

DESCRIPTION OF THE PREFERRED EMBODIMENTS

Figure 1:
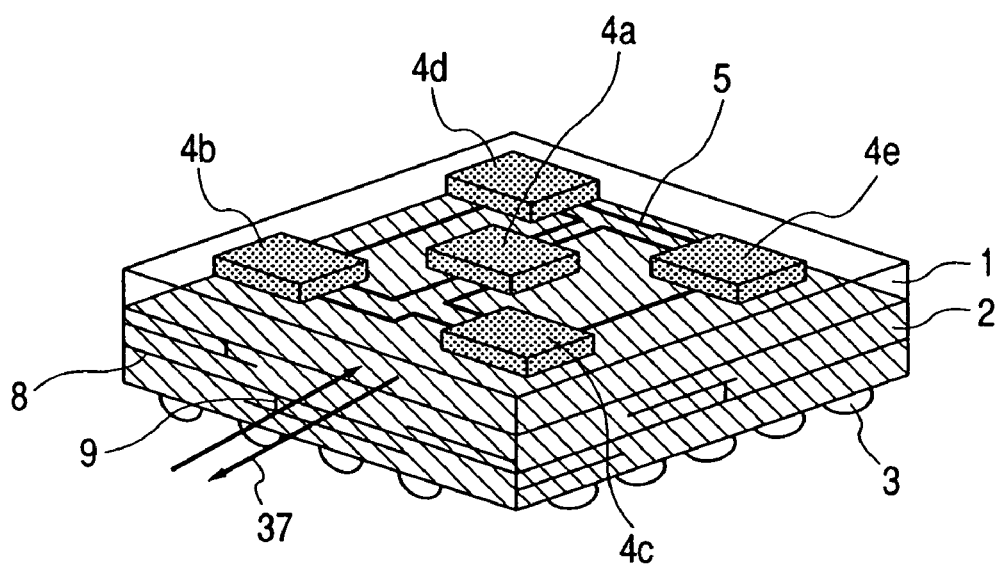
FIG. 1 is a perspective view of an optical and electrical elements combined device of a first embodiment according to the present invention.

An optical waveguide device, an optical and electrical elements combined device, a method of driving the optical and electrical elements combined device, and an electronic equipment using the optical and electrical elements combined device which are provided by the present invention have the constitutions as described above.

The optical waveguide device of the present invention includes the following aspects.

Each of the optical input and output ports may include an optical element (light-emitting element or light receiving element) for receiving or emitting a light in a direction nearly perpendicular to an optical waveguide direction in the optical waveguide, and optical path changing means provided in a desired position within the optical waveguide in correspondence to the optical element. At this time, the optical waveguide device may be of an aspect in which the optical path changing means is composed of a optical reflector having a projection shape, and the optical element is a surface type element mounted to the optical waveguide in a state in which its central portion is aligned with a position of a vertex of the projection portion of the optical reflector, and each of the optical elements transmits and receives a signal to and from the whole area within the optical waveguide. Alternately, the optical waveguide device may be of an aspect in which the optical path changing means is composed of a optical reflector having a projection shape, and the optical element is a surface type element mounted to the optical waveguide in a state in which its central portion is aligned with a position of a vertex of the projection portion of the optical reflector, and each of the optical elements transmits and receives a signal to and from only a partial area within the optical waveguide.

The above-mentioned optical element includes a surface type element made of semiconductor crystalline materials, and can have a structure in which only a thin film layer required for light-reception or light-emission of the semiconductor crystalline materials is transferred to the above-mentioned optical waveguide to remove a semiconductor substrate. An optical waveguide such as an optical waveguide layer (hereinafter, it may also be referred to as "a slab type optical waveguide", if necessary) can be made of polycarbonate, polyimide, BCB, SU-8 (product name), siloxane, polysilane, or an organic material polymer or oligomer obtained by coupling a functional group to a principal chain or a side chain of such a material.

The above-mentioned optical waveguide is typically a slab type optical waveguide. In addition, an optical signal transmitted from the side of the above-mentioned optical output port is constituted by a packet signal train formed of a finite pulse train. The above-mentioned timing control signal is individually sent as an instruction signal used to select adoption or rejection of the packet signal to the side of the optical input port to carry out time division packet switching to thereby switch the optical connection between the optical input and output ports. With such a configuration, in an optical and electrical elements combined device in which a slab type waveguide, electrical circuits and electrical chips for operating the electrical circuits are integrated, a signal connection between chips can be carried out in accordance with an electrical signal used to control broadcast and packet switching of an optical packet signal. The wiring switching can be carried out in accordance with an electrical signal which is delivered with a clock frequency lower than that of an optical signal. However, by carrying out the timing control, the wiring switching can be effectively carried out at a high speed.

The optical and electrical elements combined device of the present invention includes electrical circuits, electrical chips for operating the electrical circuits, and the optical waveguide device as described above. The optical and electrical elements combined device is characterized in that a signal connection between the electrical chips is carried out using both an optical connection using the optical signal, and an electrical connection using at least the timing control signal used to control transmission and reception of the optical signal.

Here, a description will be given with respect to the feature of a typical example of the present invention in which the packet switching of an optical signal is carried out in a time division manner in accordance with timing control using an electrical connection specially wired between electrical chips. In a relatively small area about 50 mm square, the electrical wiring between chips can be easily conducted. Also, since an electrical control signal for the packet switching has only to be sent every packet obtained by bundling high speed optical signals, this electrical control signal may be a slow signal which is obtained by dividing a clock frequency of a clock signal within the electrical chip. Accordingly, this becomes effective for an optical connection within an electrical circuit substrate. In addition, since in this method, the selection between adoption and rejection of a packet signal is controlled in accordance with an electrical signal which is specially sent, it is unnecessary to insert transmission destination address data into a packet. Thus, a signal resource within the packet can be effectively used as much as possible to allow an effective transfer speed to be increased, and also no destination of an optical wiring is specified. Consequently, a line-shaped optical waveguide is not necessarily required, and hence an optical signal can be transmitted with an inexpensive slab type optical waveguide in a broadcast manner.

Enabling an optical signal to be propagated in a broadcast manner allows the transmission and reception of a signal to be switched between a style of one to many and that of many to many at a high speed. Moreover, for the purpose of allowing the switching to be carried out among a plurality of systems at a high speed and of realizing miniaturization and a low cost, an optical and electrical elements combined type substrate or a chip package to which elements are mounted according to the present invention shows the effect. In particular, it is most suitable for a mobile device. Since the packet switching which is carried out in the conventional optical communication is performed within a small area in such a manner, this system can become an interchip packet switching system making the best use of such a merit as to be able to electrically transmit a control signal as much as possible.

Figure 4A:
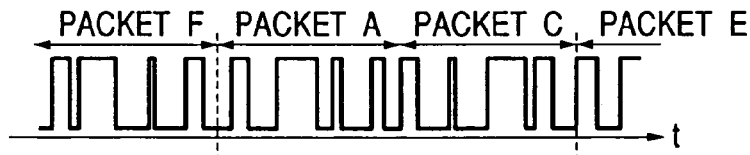
FIGS. 4A, 4B and 4C are timing charts useful in explaining a timing of receiving a signal in the optical and electrical elements combined device of the first embodiment according to the present invention.
Figure 4B:
Figure 4C:
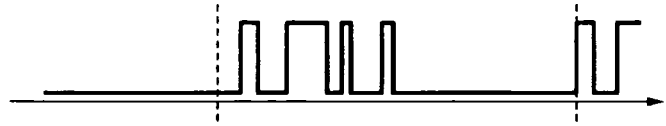

As an example of realizing such a system, there is a chip size package as shown in FIG. 1. In this example, a slab type waveguide (optical waveguide layer) 1 is integrated on a multi-layered electrical wiring layer 2 so that both an optical connection and an electrical connection can be carried out among LSI 1 to 5 of a plurality of bare chips. An optical signal is transmitted to and received from optical elements connected below the LSIs. Then, an optical signal is propagated so that the elements can receive the same signal, and also the control is carried out so that the signal is acquired only at a timing of fall of an electrical control signal specially sent as shown in FIGS. 4A to 4C. Therefore, if a packet is composed of 128 bits, for example, an electrical signal has to be sent at a low clock frequency which is obtained by dividing a clock frequency for the optical signal by 128.

The system can be configured by successively switching transmission sources, or by using light intensity multiplexing together with spatial multiplexing in a multi-layered optical waveguide layer. A control sequence for packet switching which is previously programmed is stored in a memory provided inside a circuit or outside a device to be successively read out or downloaded from the outside to allow addition and rewrite to be carried out. Thus, the operation of the device can also be switched at a high speed concurrently with the download.

In addition, a system LSI which has chips mounted at high density to be capable of switching systems at a high speed can be configured using the optical and electrical elements combined device in which the electrical chips, the optical waveguide device and the electrical wiring layer are integrated. This system LSI can also be made to function as a system on chip (SoC) which realizes multiple functions with one chip or as a system in package (SiP) which is mounted onto an electrical circuit substrate after packaging. Of course, the system LSI can be utilized as an optical and electrical elements combined substrate as being utilized as one daughter board. In such a manner, the optical and electrical elements combined device according to the present invention contains the levels ranging from the chip level to the substrate level on the basis of a size, a mounting method, an application method, an operation system, and the like.

If that optical and electrical elements combined device is used in multi-media equipment, it is possible to cope with a multiple wireless system. Moreover, the switching between systems can be carried out at a high speed, and the video and voice information can be processed at a high speed.

A method of driving the optical and electrical elements combined device of the present invention is characterized in that an optical signal transmitted from the side of the optical output port is constituted by a packet signal train formed of a finite pulse train, and the timing control signal is individually sent as an instruction signal used to select adoption or rejection of a packet signal to the side of the optical input port to carry out time division packet switching to thereby switch an optical connection between the optical input and output ports, and an electrical signal used to select between adoption and rejection of the packet signal is transmitted at a clock frequency depending on a repetitive period of a packet train from the electrical chip on an transmission side, and an electrical signal pulse used to select between adoption and rejection of the packet signal is received at a timing earlier than a packet train selected in the electrical chip on a reception side, and the packet signal is started to be captured at a timing of fall of the electrical signal pulse.

Further, the method of driving the optical and electrical elements combined device includes an aspect in which the optical signal transmitted from the side of the optical output port is constituted by the packet signal train having a finite pulse train, and the timing control signal is individually sent as an instruction signal used to select adoption or rejection of the packet signal to the side of the optical input port to carry out time division packet switching to thereby switch an optical connection between the optical input and output ports, and control patterns for the packet switching are stored in a memory provided inside or outside the optical and electrical elements combined device, and the control patterns are successively read out from the memory to control the operation of the optical and electrical elements combined device.

An electronic equipment according to the present invention is characterized in that a high speed optical connection between electrical chips can be freely reconfigured by incorporating the optical and electrical elements combined device of the present invention, and connections among a plurality of built-in systems can be switched at a high speed with one equipment.

Concrete embodiments will hereinafter be described with reference to the accompanying drawings in order to clarify an embodiment mode of the present invention.

First Embodiment

A perspective view of an optical and electrical elements combined device as a first embodiment of the present invention is shown in FIG. 1. In this embodiment, an optical waveguide layer 1 (slab type waveguide) which allows an optically free connection is laminated on a substrate 2 constituting a multilayer electrical wiring layer to be integrated with the substrate 2. In the form of FIG. 1, the optical waveguide layer 1 of a single layer is integrated on the uppermost surface. However, as will be described in subsequent embodiments as well, a form may also be adopted such that a multi-layered optical waveguide layer is integrated inside the electrical wiring layer.

As a material of the substrate 2 constituting the multi-layered electrical wiring layer, FR4 as constituting a printed substrate may be available. The following may also be available: an organic material such as a polyimide resin or an aramid resin; an inorganic ceramic material such as $Al_2O_3$ or AlN; glass; or a hybrid material obtained by mixing these materials. The electrical wiring layer is built-up so that electrical wirings 8 of the electrical wiring layers are connected through via holes 9, and is provided with electrodes 3 as an interface with the outside to allow a so-called system in package (SiP) having one function as the whole chip to be configured. That is to say, as a shape of a chip, a chip size package (CSP) is provided, and its size is in the range of about 10 mm to 50 mm square. Passive chips such as resistors, capacitors and coils, or an IC as an active chip may be incorporated inside the multi-layered electrical wiring layer.

While the slab type resin optical waveguide layer 1 with a 100 μm thickness is integrated so as to overlie the electrical wiring layer, its thickness is not limited to this value. In this case, polycarbonate Z is used as a material of the waveguide layer 1. However, in addition to polycarbonate, an optical resin material having a relatively high glass-transition temperature such as polyimide, siloxane, SU-8, BCB, or polysilane is suitably used. Si-LSIs 1 to 5 (4a to 4e) of bare chips are mounted on the waveguide layer 1, and an optical connection between the chips can be carried out using optical I/O elements (constituting optical input and output ports) integrated below these chips, more specifically, a semiconductor laser and a pin photodiode. For the bare chip, a so-called wafer level chip size package (WLCSP) is suitably used in which electrodes for simultaneously carrying out electrical connections are formed when manufacturing an LSI. With respect to an interconnection between chips, an optical connection is carried out for a reconfigurable wiring portion. However, for an electrical connection portion, an electrical connection is carried out with an electrical wiring 8 on the substrate 2 through via wirings or the like formed so as to extend completely through the optical waveguide layer 1, or with an electrical wiring 5 formed on the optical waveguide layer 1. The connection with the outside of the chips can be also carried out through optical spatial transmission 37. While a size of the optical waveguide layer 1 is equal to that of the substrate 2, a shape of the optical waveguide layer 1 is not limited to this shape. Thus, a shape may be adopted such that the optical waveguide layer is provided only in a necessary area.

Figure 2:
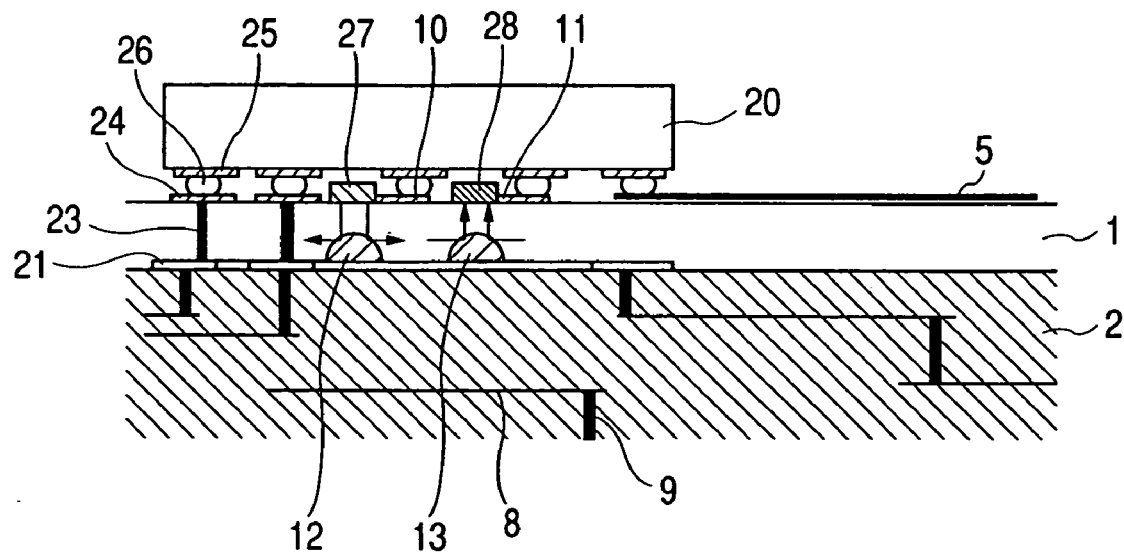
FIG. 2 is a cross sectional view useful in explaining mounting of a chip in the optical and electrical elements combined device of the first embodiment according to the present invention.

An example of mounting of a chip is shown in FIG. 2. FIG. 2 shows a cross sectional view in the periphery of one chip. Then, a bare chip LSI 20 is mounted onto the optical waveguide layer 1 though electrodes 24 and 25 using solder bumps 26. An electrode 10 for driving a light-emitting element 27, an electrode 11 for driving a light-receiving element 28, and an electrical wiring 5 formed on a surface of the optical waveguide layer 1 are connected to electrodes of the bare chip LSI 20 through solder bumps 26, respectively. The electrode 24 is connected to an electrical wiring 21 on the substrate 2 though a via wiring 23 extending completely though the optical waveguide layer 1. Moreover, an electrical circuit is configured using a via wiring 9 and an internal wiring 8 within the substrate 2. The wiring 5 on the surface of the optical waveguide layer 1, for example, is used for transmitting a control signal between the LSI chips. Then, the control signal between chips may also be transmitted though an electrical wiring 21 on the surface of the substrate 2, the internal wiring 8, or the like.

In this embodiment, the optical connection is carried out using the slab type optical waveguide 1 in a broadcast manner. An optical signal from the light-emitting element 27 is coupled to the optical waveguide layer 1 through a hemispherical reflector 12 and is transmitted. Optical signals propagated from other chips through the optical waveguide layer 1, likewise, are coupled to the light-receiving element 28 through a reflector 13 and are received. If centers of these optical elements are aligned with positions of vertexes of the reflectors along a direction perpendicular to the optical waveguide layer 1, respectively, the optical elements can be optically coupled to the whole slab type optical waveguide 1. In contrast, if centers of these optical elements are decentered with respect to the positions of the vertexes of the reflectors, the optical elements can be optically coupled only to an area having a fixed radiation angle. An optimal propagation form may be selected in accordance with the positions of the LSI chips and necessity of light intensities. This will be described later.

In this embodiment, the optical elements are a GaAs surface type semiconductor laser or a pin photodiode. The thin optical elements with a 7 μm thickness are used which are integrated on the optical waveguide layer 1 after removal of the GaAs substrate through functional layer transfer (FLT). Hence, if the LSIs are mounted using normal solder bumps (each having a diameter in the range of 30 to 100 μmΦ), a sufficient height clearance can be obtained. In a case where the GaAs substrate is not removed, in order to protect the optical elements, a spacer (not shown) may be inserted between the LSI chip 20 and the optical waveguide layer 1. In addition, these optical elements may be integrated on the LSI chip in a hybrid manner, or may be embedded in the optical waveguide layer 1. In a case where the optical elements are of the type of being embedded in the optical waveguide layer 1, since projection portions of the optical elements can be lowered, such a spacer becomes unnecessary.

Figure 3:
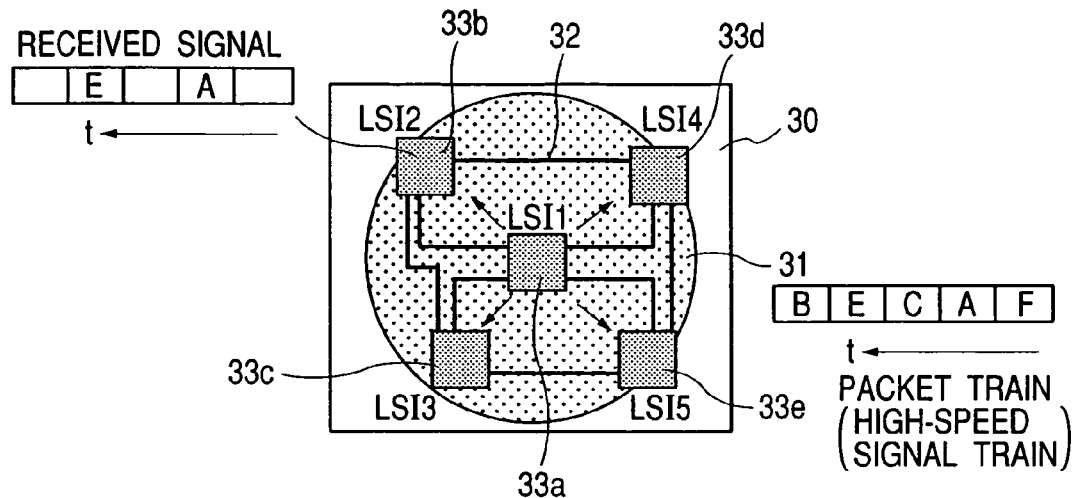
FIG. 3 is a view useful in explaining a method of transferring an optical signal in the optical and electrical elements combined device of the first embodiment according to the present invention.

Next, control and an operation of the reconfigurable optical connection will hereinbelow be described with reference to FIGS. 3 to 5B. FIG. 3 is a plan view when the optical and electrical elements combined device 30 of FIG. 1 is viewed from an upper position. For example, an optical signal 31 is transmitted in all directions from an LSI chip 1 (33a) to an optical waveguide, and the signal is received at a desired timing in other LSI chips 2 to 5 (33b to 33e). The optical signal 31 is formed as a fixed length packet with a pulse train of 128 bits as one unit. Then, a reception instruction is individually sent as an electrical signal to the necessary LSI chips through an electrical wiring 32 every packet to thereby control the reception. At this time, for example, if a frequency of an internal clock signal of the LSI chip is 200 MHz, and an internal bus is 16 bits parallel, serialization is made so that as an optical signal of 3.2 Gbps, a parallel signal for 128/16=8 bits is transmitted in the form of one packet. These numeric values can be changed in accordance with a system specification. The optical signal is transmitted and received at 3.2 Gbps in such a manner. Since a repetitive period of the packet becomes 3,200 MHz/128=25 MHz, an electrical signal for control of a reception timing may be very slow. In an operation example of FIG. 3, a packet train transmitted from the LSI chip 1 (33a) becomes FACEB . . . in order. Then, the LSI chip 2 (33b) is instructed to receive only packets A and E in accordance with a control signal.

A chart useful in explaining intelligibly this situation is FIGS. 4A to 4C. The number of bits of one packet is illustrated as 20 bits for the sake of simplicity. FIG. 4A shows an optical signal from LSI 1, and each packet of the optical signal is composed of an optical pulse train which is ASK-modulated with a serialized digital high speed signal. This optical signal, as described above, is processed in a broadcast manner. On the other hand, FIG. 4B shows an electrical signal for control of a reception timing sent from the LSI 1 to the LSI 2. In order to allow the LSI 2 to receive the packets A and E, if an electrical pulse is previously sent to the LSI 2 so that the reception is started at a timing of fall of the electrical pulse, as shown in FIG. 4C, the desired signal can be received by the LSI 2.

At this time, as has already been described, a clock rate of the electrical control signal may be much slower than that of the optical signal train. In addition, in the usual way, in the normal packet switching, transmission origin, reception destination information, or the like is added to a head or the like of a signal train. However, in the interchip transmission of this embodiment, since a transmission distance is very short, it is easy to adjust timings of the high speed optical signal and the electrical control signal to each other. Then, there arises a merit that even if the address information or the like is not especially added to the packet, the packet switching becomes possible, and hence information can be contained within the packet as much as possible. For the adjustment of the timings, a delay time in an optical transmission/reception portion of a parallel to serial conversion circuit or the like and a total delay time of an optical signal in propagation delay may be made to agree with a delay of the electrical control signal using a length of the electrical wiring, a phase adjusting circuit, and the like. Of course, the timing may be adjusted by adding a start signal to a head of a packet or providing a buffer element in an LSI chip.

A comparison is made of this embodiment with a case where all such interchip connections are electrically carried out. In case of a parallel connection, sixteen electrical wirings are distributed among all the chips. However, in order that a signal having a relatively high frequency of 200 MHz is propagated, a design for a strip line is required, and hence there arises a limitation to wiring density and a pattern from a viewpoint of electromagnetic radiation and crosstalk. For that reason, a board area is increased. In a case where serialization is made in order to transmit an electrical signal, a problem of the board area is solved. However, in case of a signal with about 1 GHz frequency, an increased high cost as well as an increased high power due to a board material and a shielding countermeasure become problems resulting from attenuation and delays of electrical signals in the substrate, and radiation noises. Consequently, the optical connection according to the present invention can become a solution to such problems from a viewpoint of high speed and compact mounting. In addition, adoption of the packet switching system results in a slow substantial transfer rate. However, since the wiring resource is effectively utilized and no expensive optical part is required, this becomes advantageous in terms of realization of a low cost. Note that, the packet length and the clock speed shown in this embodiment are merely an example, and hence an optical design is made in accordance with a necessary system. In addition, the packet length may also be made variable.

Figure 5A:
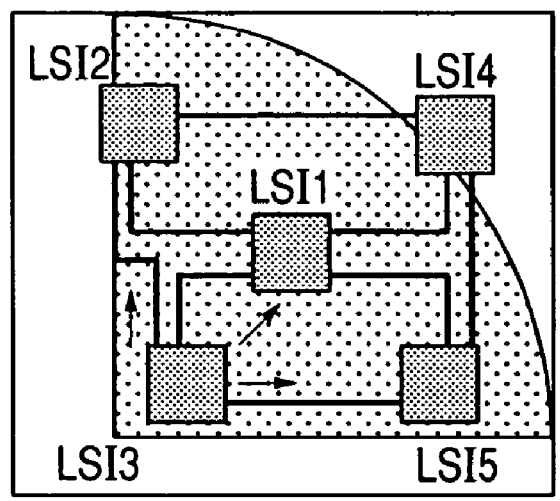
FIGS. 5A and 5B show views useful in explaining a method including propagating an optical signal in the optical and electrical elements combined device of the first embodiment according to the present invention.
Figure 5B:
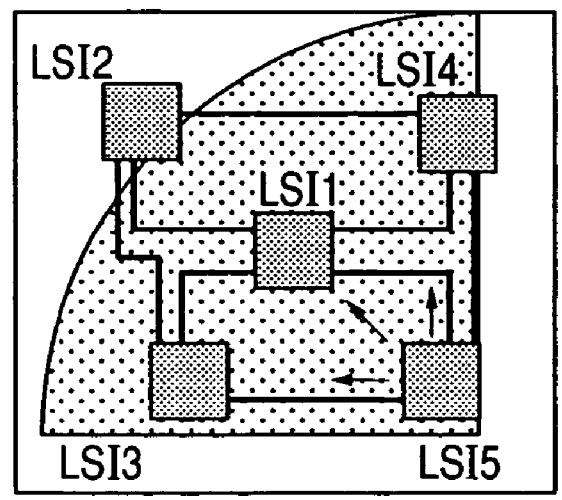

While there is shown in FIG. 3, an example in which the optical signal is transmitted from the LSI chip 1 to other chips, a transmission source and a reception destination can be changed. For example, in FIG. 5A, the LSI chip 3 is a transmission source to carry out the broadcast, while in FIG. 5B, the LSI chip 5 is a transmission source. Here, since the transmission direction of a light desirably has an emission angle of 90 degrees as shown in FIGS. 5A and 5B, as described above, the centers of the light-emitting elements, and the vertexes of the optical reflectors provided within the optical waveguide layer are arranged apart from each other to limit the propagation direction. As a result, since a loss due to diffusion of a light is decreased, a transmission distance can be extended up to the LSI chip on the diagonal corner. This reason is that while the light power per unit area in case of diffusion in all directions, when a propagation loss of the optical waveguide layer is sufficiently small, attenuates in proportion to $1/2\,\pi R$ (R: propagation distance), if the diffusion of the optical signal is limited to the direction of 90 degrees, then the light power per unit area attenuates in proportion to $2/\pi R$. In this embodiment, since one optical waveguide layer is provided, for a certain fixed period of time, one LSI chip occupies the one optical waveguide layer to become a transmission source, and each of other chips receives an optical signal, and the originating source is then successively changed one after another.

As described above, in this embodiment, it is possible to realize the miniature and wiring reconfigurable chips combined type system LSI which can be operated at a high speed.

Second Embodiment

Figure 6A:
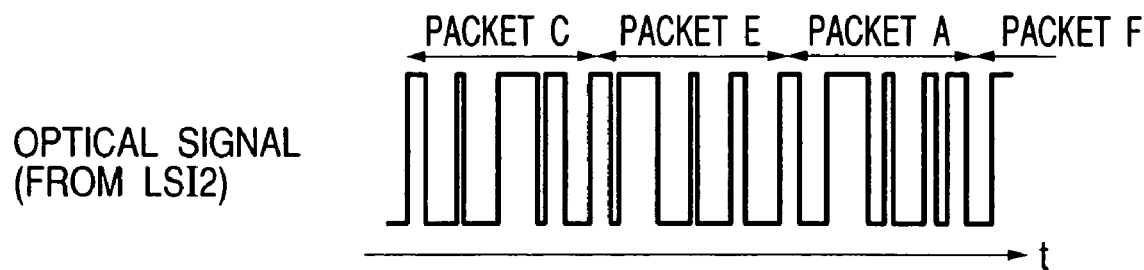
FIGS. 6A, 6B and 6C show views useful in explaining a method including multiplexing optical signals in an optical and electrical elements combined device according to a second embodiment of the present invention.
Figure 6B:
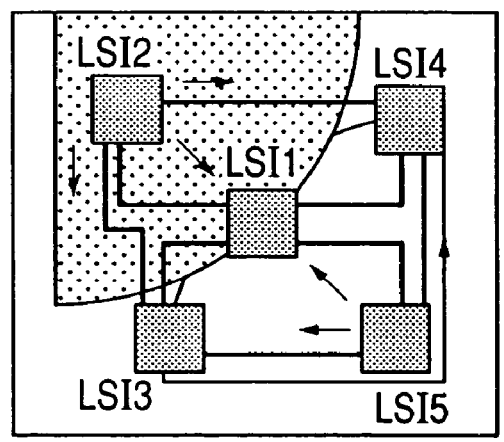
Figure 6C:
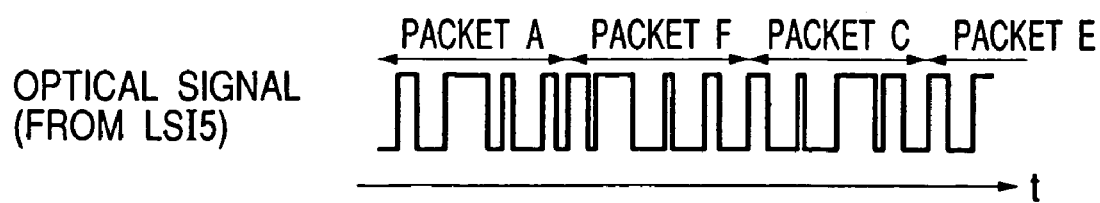

A second embodiment according to the present invention attains simultaneously transmitting signals from two or more chips. When as shown in FIGS. 6A to 6C, different signals are simultaneously transmitted from LSI chips 2 and 5, LSI chips 1, 3 and 4 each to be a reception chip must separately receive the optical signals. Then, as shown in FIGS. 6A to 6C, this is realized in such a way that the light intensities of the two optical signals are made different from each other, and the two optical signals are then processed in a reception circuit. The light intensity can be readily controlled if a current value for modulation of a laser is changed.

Assuming that for example, a light intensity of the chip 5 is Po; and a light intensity of the chip 2 is 2Po, if quantities of attenuation of the two optical signals received in the chip 1 are equal to each other at an equal distance, then the following combinations are offered.

a) (chip 2, chip 5)=(0, 0)→received power; 0
b) (chip 2, chip 5)=(1, 0)→received power; 2αPo
c) (chip 2, chip 5)=(0, 1)→received power; αPo
d) (chip 2, chip 5)=(1, 1)→received power; 3αPo where α is a rate of power attenuation. In such a manner, since values of the optical signals from the two LSI chips can be determined on the basis of the received power, the two optical signals can be separately received. Since a rate of the attenuation differs depending on the position of the chip, if quantities of attenuation, powers of emitted lights, quantities of delays, and the like are previously prepared in the form of a database, and a signal processing is previously programmed, then it is possible to cope with various cases other than the cases of FIGS. 6A to 6C.

If the control in accordance with which signals can be simultaneously transmitted from a plurality of transmission sources is carried out, then it is possible to increase a substantial signal transfer rate.

Third Embodiment

Figure 7A:
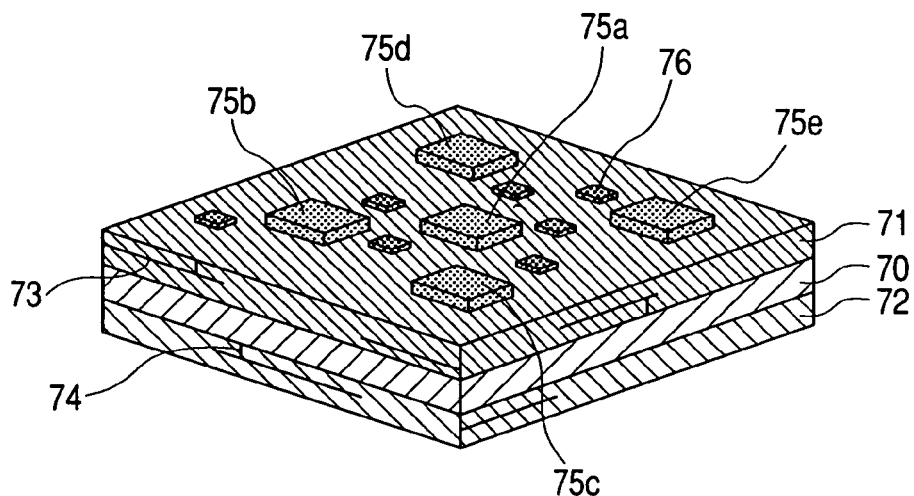
FIGS. 7A, 7B and 7C show a view of an optical and electrical elements combined device according to a third embodiment of the present invention, and views useful in explaining a method including propagating an optical signal in the optical and electrical elements combined device.

A third embodiment according to the present invention is such that as shown in FIG. 7A, an optical waveguide layer 70 formed in a multi-layered structure is incorporated between electrical wiring layers 71 and 72. Unlike the first embodiment, this structure does not constitute a package, but constitutes a multichip module (MCM) realizing one function, and a size of the multichip module is in the range of about 50 mm to 100 mm square. While an interface with the outside is not illustrated, the multichip module is connected to the outside through a connector, an electrical cable, or an optical cable. All electrical wiring layers 71 and 72 including internal wirings 73 and 74, respectively, and an optical waveguide layer 70 are built-up, and LSIs 1 to 5 (75a to 75e), passive devices 76 and the like are compactly mounted on a surface of the electrical wiring layer 71.

The multi-layering of the optical waveguide layer 70 allows the mutual optical connections of a plurality of LSI chips or memory chips as described in the first embodiment to be simultaneously carried out without using the method of changing the light intensity as in the second embodiment. In a case where a substrate size becomes relatively large as in this embodiment, it becomes difficult to multiplex optical signals by changing intensities of lights. Consequently, even if some increase in cost is accompanied, in case of a module of a large size, adoption of the multi-layering and the spatial multiplexing is excellent in terms of an increase of the operation speed and increased high performance. In this embodiment, an electrical connection for control between the chips is carried out using an internal wiring 73 of the electrical wiring layer 71.

Next, a multiplexing method will hereinbelow be described. In a case where a propagation distance becomes long as in this embodiment, if an optical signal is diffused in all directions, then the attenuation of the light power becomes large. On the other hand, if for the purpose of solving this problem, a current is increased in order to increase the light intensity, then the power consumption becomes a problem. Then, as has already been described in the first embodiment, the limitation of the diffusion angle is also carried out in this embodiment as well.

Figure 7B:
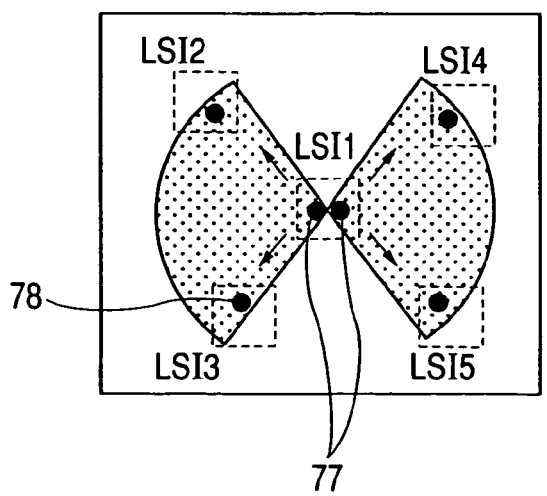
Figure 7C:
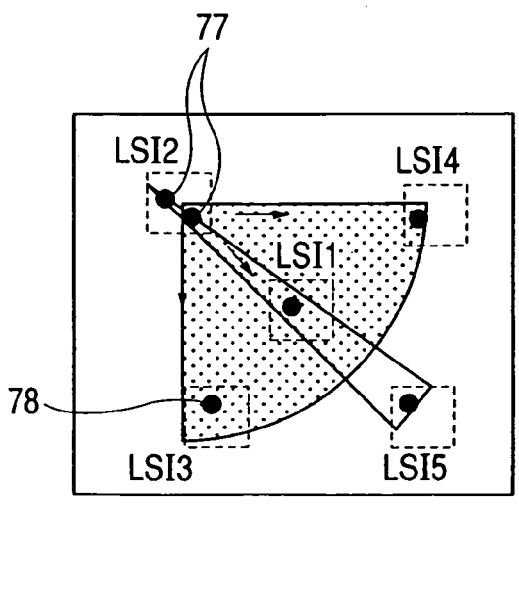

More specifically, optical signals from the LSI 1 are transmitted for the LSI 2 and the LSI 3 and for the LSI 4 and the LSI 5 at an emission angle of 120 degrees (FIG. 7B). Since the optical signals can be spatially separated, the spatial division is made using two light-emitting elements 77 within the same sheet (first layer). On the other hand, a chip of the LSI 2 or the like on the diagonal corner includes a light source 77 for transmitting an optical signal for the LSI 1, the LSI 3, and the LSI 4 at an emission angle of 90 degrees, and a light source 77 for transmitting an optical signal for the LSI 5 at a narrow emission angle of 10 degrees. These light sources 77 are provided in a waveguide layer (second layer) different from the optical waveguide layer for transmission of an optical signal from the LSI 1 (FIG. 7C). This is also applied to other LSIs 3 to 5. Consequently, the optical waveguide layer has five layers, and the two light-emitting elements 77 for transmitting optical signals from one chip, and light-receiving elements 78 corresponding to the respective chips other than the transmission source the number of which are four in total are integrated in each layer. Thus, the light-receiving elements 78 connected from the corresponding one of the LSI chips are included in all the layers without a light-emitting element connected from the chip concerned.

With such a structure, the high speed connections among a plurality of LSI chips can be simultaneously carried out so that the very high speed parallel processing becomes possible. It should be noted that the number of layers of the multi-layered optical waveguide layer 70, the method of arranging the light-emitting elements 77 and the light-receiving elements 78, the diffusion directions, and the method of dividing an area are merely shown as an example, and hence the present invention is not intended to be limited to the above description.

Fourth Embodiment

A fourth embodiment according to the present invention is such that the signal transfer among LSI chips is previously programmed in order to operate a system in accordance with a centralized control. The embodiments up to this embodiment adopt the form for carrying out the distributed parallel operation in each LSI chip as the real time processing. However, the fourth embodiment adopts a method in which, for example, the LSI chip electrically transmits a reception timing control signal to each chip in accordance with a sequence stored in a memory within the LSI chip 1 shown in FIG. 1.

Figure 8:
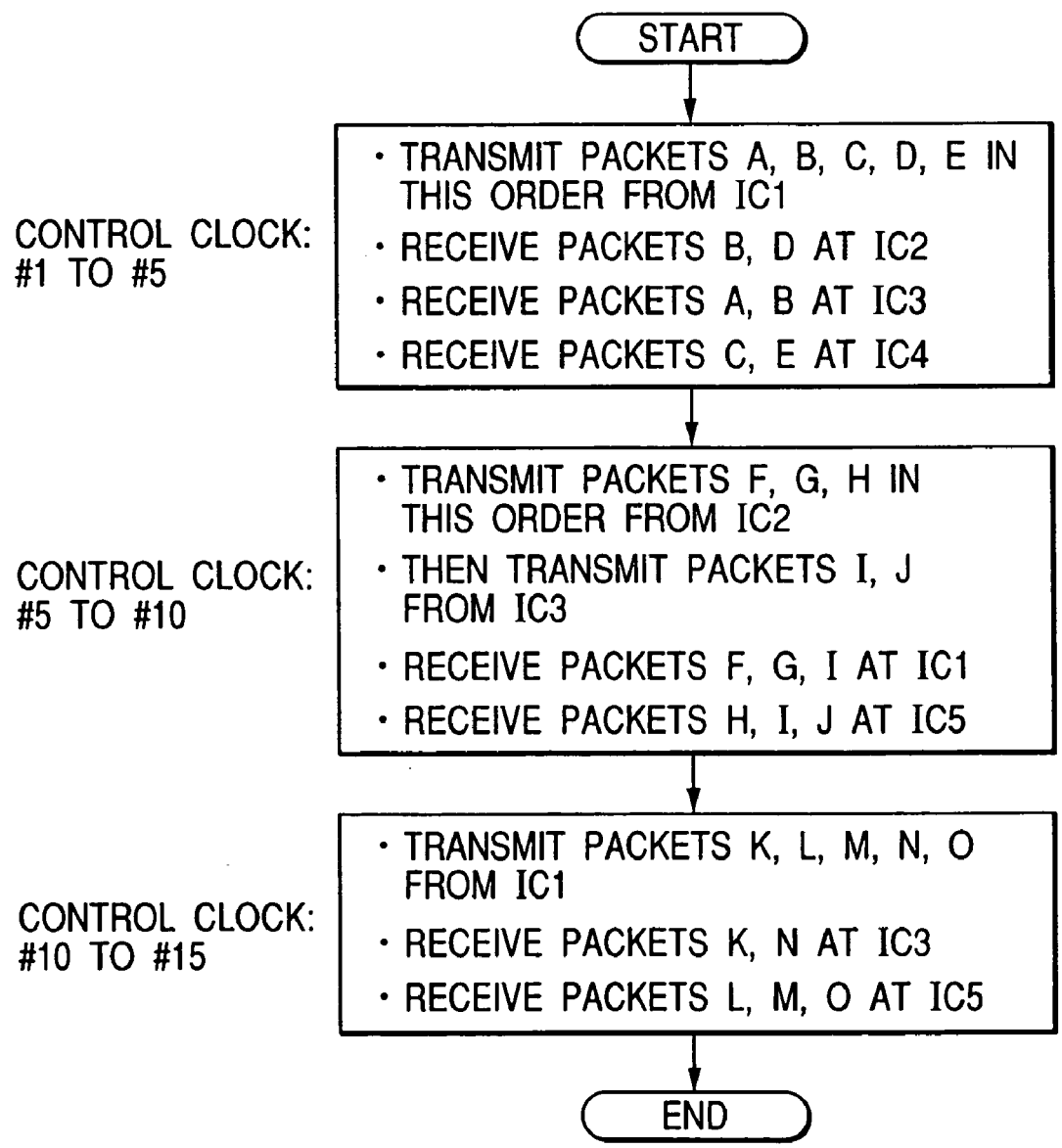
FIG. 8 is a diagram useful in explaining an example of a flow chart for switching of optical packet signals in a fourth embodiment according to the present invention.
Figure 9:
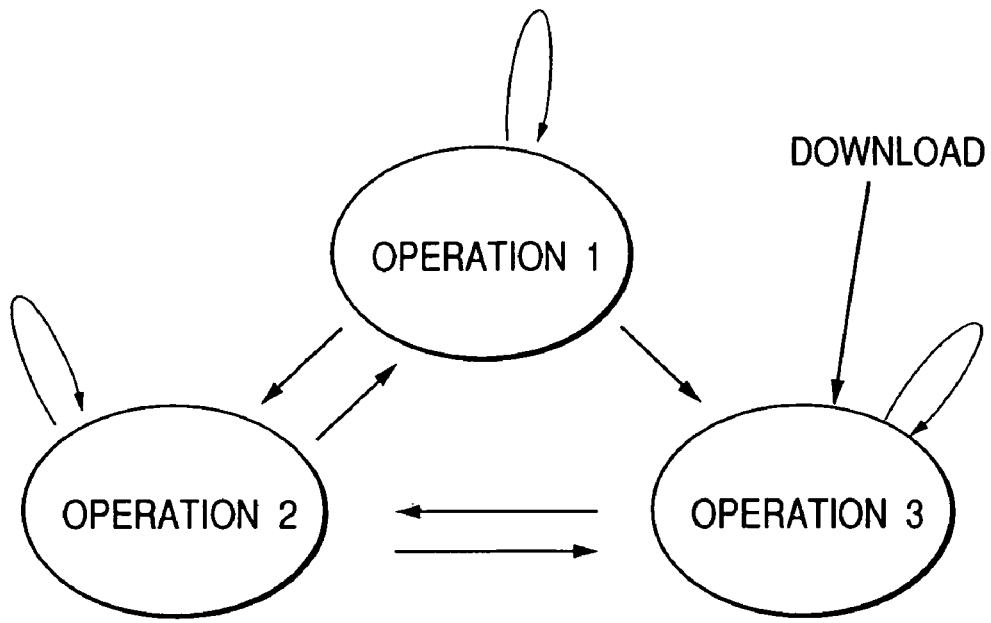
FIG. 9 is a state transition view showing an example of state transition in the fourth embodiment according to the present invention.

An example of a flow chart in this embodiment is shown in FIG. 8. Upon reception of a start signal, a control clock signal (its frequency is 25 MHz in the first embodiment) a frequency of which is obtained by dividing the frequency (200 MHz in the first embodiment) of an internal clock signal of an LSI chip is counted by a program counter to switch an optical packet signal in accordance with a control signal sent from the LSI chip 1. In the flow chart of FIG. 8, it is meant that one operation ends after counting 15 clocks, i.e., after a lapse of 0.6 μsec. In a case where an actual built-in apparatus is intended to be operated, such a sequence as to make transition between operations is incorporated in the apparatus. FIG. 9 is a diagram showing an example of the state transition. An apparatus is operated by turning ON some switch SW while making the transition between the programmed operations. As the case may be, a certain peculiar operation program is downloaded from the outside to add a new function or upgrade the version.

Figure 10:
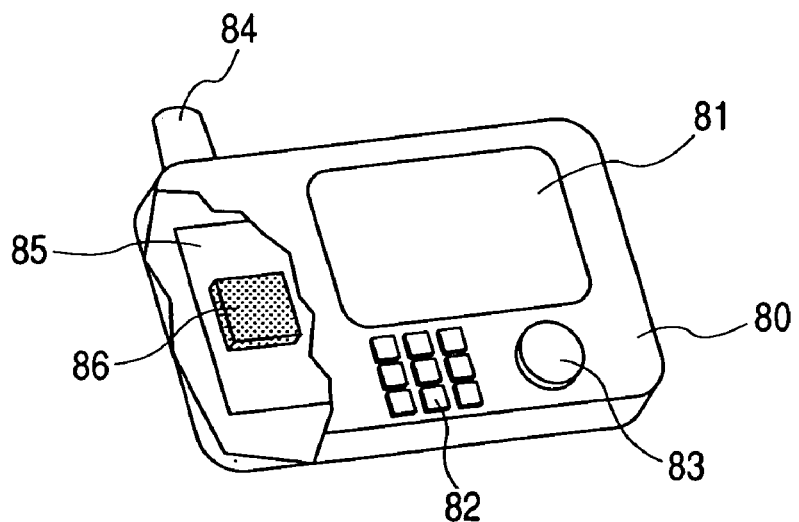
FIG. 10 is a view showing a mobile terminal of the fourth embodiment according to the present invention.
Figure 11:
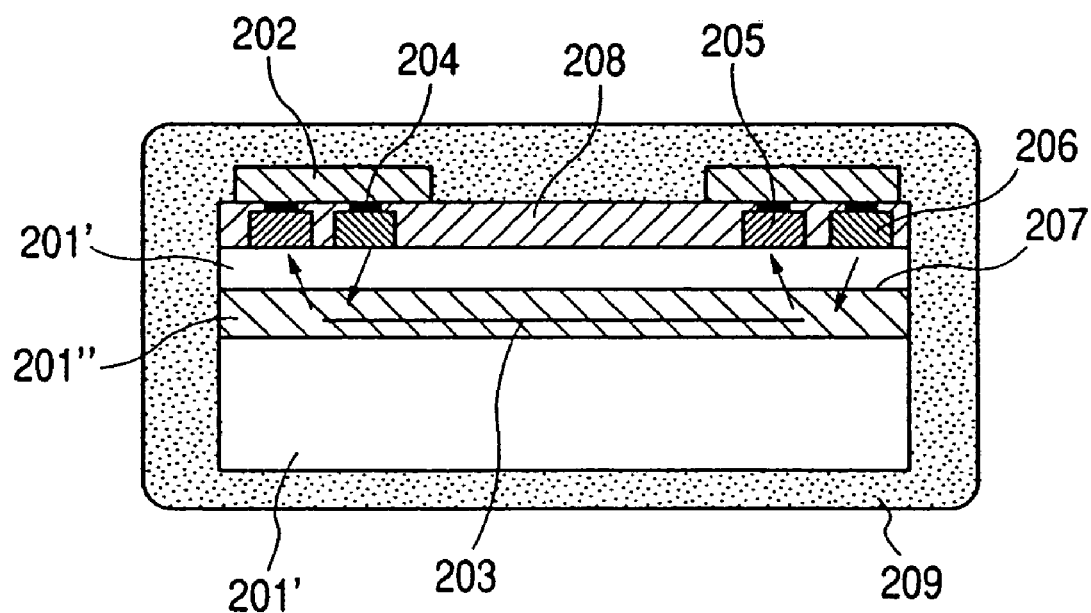
FIG. 11 is a cross sectional view showing a conventional example of an optical connection device using a slab type optical waveguide.

As an example of an apparatus which is operated in such a manner, a high function mobile terminal 80 is shown in FIG. 10. The mobile terminal 80 is provided with a display unit 81, man-machine interfaces such as a button manipulation unit 82 and a dial manipulation unit 83, and a wireless unit including an antenna 84 for transmitting and receiving therethrough a signal to and from the outside. The inside of the apparatus is provided with a main board 85, and a chip or package 86 self-containing an optical reconfigurable wiring to configure a built-in system.

In recent years, as wireless systems, many systems such as a public mobile telephone network of a WCDMA or CDMA2000x system, a PHS, a wireless LAN (IEEE802.11a, b or the like), a wireless IEEE1394, ultra-wide band (UWB), and a Bluetooth have been made fit for practical use. Then, smooth switching among these systems, provision of a wireless unit capable of executing a processing with one chip, and the like are expected. With the optical and electrical elements combined chips according to the present invention, a so-called software wireless system can be realized to allow a plurality of wireless systems to be dynamically switched at a high speed. Consequently, it is possible to provide the miniature digital electronic equipment capable of high-speed processing.

With the optical and electrical elements combined chip according to the present invention, with respect to such a multi-media processing accompanied with video and voice such as compression or extension, it is possible to speedily cope with the various systems in addition to the software wireless system. In addition, the optical and electrical elements combined chip is made to function as a simple unit to be used as a miniature and high performance wireless tag. Or, a large number of chips are used and the chips are coupled to each other through the optical waveguides to allow a large scale embedded system such as a robot to be built. The present invention is applied to the whole electronic equipment requiring a embedded processing in addition to these systems to allow the high performance to be realized. For example, OA equipment such as a copying machine or a printer capable of executing a high-speed multi-media processing, an image pick-up device, a measuring instrument capable of carrying out high-speed conversion, and the like can be built using the optical and electrical elements combined device according to the present invention.

As set forth hereinabove, according to the above-mentioned embodiments, in the next generation multi-media electronic equipment or the like, it is possible to realize the chip, the package, and the substrate each of which is loaded with the miniature optical waveguide device which allows the reconfigurable wiring with which the wiring switching can be made at a high speed. Thus, a plurality of architectures can be configured with necessary and minimum chips and wirings, and the different architectures can be readily changed. Thus, the electronic equipment or the like to which elements are mounted with high density, and which is capable of executing the high speed multi-media processing or the like can be provided at a relatively low cost. In addition, the necessary built-in systems can be selected in accordance with the occasion to execute the optimal processing. Moreover, the switching between the systems can be carried out at a high speed with simple control.

What is claimed is:

1. An optical waveguide comprising:
    a slab-type optical waveguide layer; and
    a plurality of chips which include either an optical input port for inputting an optical signal from the slab-type optical waveguide layer or an optical output port for outputting an optical signal to the slab-type optical waveguide layer, wherein each said optical input port receives the optical signal, output by each said optical output port, from the slab-type optical waveguide layer in accordance with a timing signal inputted using an electrical connection between the plurality of chips,
    wherein the optical signal output by each said optical output port comprises a packet signal train formed of a finite pulse train, and wherein the timing signal is individually sent as an instruction signal used to select adoption or rejection of the packet signal train; and
    wherein the timing signal comprises an electrical signal formed for every packet signal train.

2. An optical waveguide device according to claim 1, wherein the optical input and output ports each comprise an optical element for receiving or emitting light in a direction nearly perpendicular to an optical waveguide direction in the optical waveguide layer, and optical path changing means provided in a desired position within the optical waveguide layer in correspondence to the optical element.

3. An optical waveguide device according to claim 2, wherein the optical path changing means is comprised of a optical reflector having a projection portion, the optical element comprises a surface type element mounted to the optical waveguide layer in a state in which its central portion is aligned with the position of a vertex of the projection portion of the optical reflector, and each of the optical elements transmits and receives a signal to and from the whole area within the optical waveguide layer.

4. An optical waveguide device according to claim 2, wherein the optical path changing means comprises an optical reflector having a projection portion, and wherein the optical element comprises a surface type element mounted to the optical waveguide layer in a state in which its central portion is aligned with a position of the vertex of the projection portion of the optical reflector, and the optical element transmits and receives a signal to and from only a partial area within the optical waveguide layer.

5. An optical waveguide device according to claim 1, wherein the optical waveguide layer is formed by laminating a plurality of layers.

6. A device combining optical and electrical elements comprising electrical circuits, the plurality of chips for operating the electrical circuits, and the optical waveguide device according to claim 1, wherein a signal connection between the electrical chips is carried out using both an optical connection using the optical signal, and an electrical connection using at least the timing signal used to control transmission and reception of the optical signal.

7. A device combining optical and electrical elements according to claim 6, wherein the optical input and output ports and the electrical chips are electrically connected to each other.

8. A device combining optical and electrical elements according to claim 6, wherein a part of or all of the electrical connection between the electrical chips is carried out using an electrical wiring formed on a surface of the optical waveguide layer, or an electrical wiring formed on an electrical circuit substrate including the electrical circuits.

9. A device combining optical and electrical elements according to claim 6, wherein a plurality of slab-type optical waveguide layers constituting the optical waveguide layer are provided with optical input and output ports from the same electrical chip.

10. A device combining optical and electrical elements according to claim 6, wherein a plurality of connection terminals for surface mounting to other electrical circuit substrates are arranged on a surface of an electrical circuit substrate including the electrical circuits, and wherein the device takes a form of a chip size package.

11. A method of driving a device combining optical and electrical elements according to claim 6, comprising the steps of:
    forming the optical signal transmitted from the side of the optical output port from a packet signal train formed of a finite pulse train;
    individually transmitting the timing signal as an instruction signal used to select adoption or rejection of a packet signal train to the side of the optical input port to carry out time division packet switching to thereby switch an optical connection between the optical input and output ports;
    transmitting an electrical signal used to select adoption or rejection of the packet signal train with a clock frequency depending on a repetitive period of a packet signal train from an electrical chip for transmission; and receiving an electrical signal pulse used to select adoption or rejection of the packet signal train at a timing earlier than a packet signal train selected in an electrical chip for reception to start capturing the packet signal train at a timing of fall of the electrical signal pulse.

12. A method of driving a device combining optical and electrical elements according to claim 6, comprising the steps of:
   forming an optical signal transmitted from the side of the optical output port from a packet signal train formed of a finite pulse train;
   individually transmitting the timing signal as an instruction signal used to select adoption or rejection of the packet signal train to the side of the optical input port to carry out time division packet switching to thereby switch an optical connection between the optical input and output ports;
   storing control patterns for the packet switching in a memory provided inside or outside the optical and electrical elements combined device; and
   successively reading out the control patterns from the memory to control an operation of the device combining optical and electrical elements.

13. A method of driving a device combining optical and electrical elements according to claim 11, wherein the electrical chip for transmission and the electrical chip for reception are successively changed in a time division manner.

14. A method of driving a device combining optical and electrical elements according to claim 11 or 12, wherein when optical signals are transmitted at the same time within the same optical waveguide layer from a plurality of electrical chips, light intensities of the optical signals from the plurality of electrical chips are made different from one another.

15. A method of driving a device combining optical and electrical elements according to claim 12, wherein the control patterns for the packet switching are rewritable by being downloaded from the outside of the device combining optical and electrical elements, and the operation of the device combining optical and electrical elements is switched concurrently with the download.

16. An electronic device embedded in the device combining optical and electrical elements as claimed in any one of claims 7 to 10 for enabling a high-speed optical connection between electrical chip to be freely reconfigured, the device being so constructed that connections among a plurality of embedded systems can be switched at a high speed with one device.

* * * * *

UNITED STATES PATENT AND TRADEMARK OFFICE
CERTIFICATE OF CORRECTION

| | |
|---|---|
| PATENT NO. | : 7,151,865 B2 |
| APPLICATION NO. | : 10/735903 |
| DATED | : December 19, 2006 |
| INVENTOR(S) | : Toshihiko Ouchi |

It is certified that error appears in the above-identified patent and that said Letters Patent is hereby corrected as shown below:

COLUMN 3:
Line 19, "cross sectional" should read --cross-sectional--.
Line 52, "cross sectional" should read --cross-sectional--.

COLUMN 4:
Line 9, "a optical" should read --an optical--.
Line 18, "a optical" should read --an optical--.

COLUMN 6:
Line 37, "an transmission" should read --a transmission--.

COLUMN 7:
Line 32, "overlie" should read --overlay--.
Line 51, "through via" should read --via--.
Line 62, "cross sectional" should read --cross-sectional--.

COLUMN 8:
Line 4, "though a via" should read --via--.

COLUMN 10:
Line 19, "This" should read --The--.
Line 49, "Po;" should read --Po,--.

COLUMN 14:
Line 2, "a" should read --an--.
Line 50, "chip size" should read --chip-size--.

UNITED STATES PATENT AND TRADEMARK OFFICE
CERTIFICATE OF CORRECTION

PATENT NO. : 7,151,865 B2
APPLICATION NO. : 10/735903
DATED : December 19, 2006
INVENTOR(S) : Toshihiko Ouchi It is certified that error appears in the above-identified patent and that said Letters Patent is hereby corrected as shown below:

<u>COLUMN 16</u>:
Line 20, "chip" should read --chips--.

Signed and Sealed this

Seventeenth Day of June, 2008

JON W. DUDAS
*Director of the United States Patent and Trademark Office*